United States Patent
Sato

(10) Patent No.: US 11,134,165 B2
(45) Date of Patent: Sep. 28, 2021

(54) IMAGE PROCESSING APPARATUS HAVING FUNCTIONS INCLUDING SCAN FUNCTION, CONTROL METHOD THEREOF, AND STORAGE MEDIUM STORING PROGRAM FOR EXECUTING CONTROL METHOD

(71) Applicant: CANON KABUSHIKI KAISHA, Tokyo (JP)

(72) Inventor: Kazuki Sato, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/017,175

(22) Filed: Sep. 10, 2020

(65) Prior Publication Data

US 2021/0084190 A1 Mar. 18, 2021

(30) Foreign Application Priority Data

Sep. 12, 2019 (JP) .............................. JP2019-166467

(51) Int. Cl.
*H04N 1/04* (2006.01)
*H04N 1/00* (2006.01)

(52) U.S. Cl.
CPC ....... *H04N 1/0446* (2013.01); *H04N 1/00572* (2013.01); *H04N 1/00822* (2013.01)

(58) Field of Classification Search
None
See application file for complete search history.

(56) References Cited

U.S. PATENT DOCUMENTS

| 4,393,387 | A * | 7/1983 | Kitamura | G06K 15/1261 |
| | | | | 347/240 |
| 6,122,077 | A * | 9/2000 | Kaji | H04N 1/00795 |
| | | | | 358/447 |
| 10,038,819 | B2 * | 7/2018 | Togashi | H04N 5/378 |
| 10,819,878 | B2 * | 10/2020 | Hirao | H04N 1/047 |
| 2006/0152785 | A1 * | 7/2006 | Yasuda | G02B 26/085 |
| | | | | 359/224.1 |
| 2007/0041057 | A1 * | 2/2007 | Chen | H04N 1/40056 |
| | | | | 358/474 |

(Continued)

FOREIGN PATENT DOCUMENTS

JP 2013153521 A 8/2013

*Primary Examiner* — Anh-Vinh T Nguyen
(74) *Attorney, Agent, or Firm* — Rossi, Kimms & McDowell LLP

(57) ABSTRACT

An image processing apparatus that executes jobs in parallel using a small number of resources. A controller includes an image processor that applies an image process to image data. A scanner controller includes storage for storing image data generated by scanning a document with a scanner and transfers the image data stored to the controller through a data bus. A processor executes instructions to set a frequency of an image transfer clock to a first frequency when a first job including a process that transfers image data generated by scanning documents to the controller is executed alone, and set the frequency of the image transfer clock to a second frequency lower than the first frequency when the first job is executed in parallel to a second job including an image process. The frequency of the image transfer clock is maintained at the second frequency until finishing the first job.

6 Claims, 15 Drawing Sheets

(56) References Cited

U.S. PATENT DOCUMENTS

| | | | | |
|---|---|---|---|---|
| 2007/0121771 A1* | 5/2007 | Yamada | ................ | G06F 1/3203 |
| | | | | 375/362 |
| 2008/0180765 A1* | 7/2008 | Nakashita | ............ | H04N 1/2034 |
| | | | | 358/498 |
| 2011/0188095 A1* | 8/2011 | Shiraishi | .................. | H04N 1/04 |
| | | | | 358/474 |
| 2014/0233990 A1* | 8/2014 | Hayashi | ............. | G03G 15/5054 |
| | | | | 399/301 |
| 2017/0060493 A1* | 3/2017 | Furukawa | ............ | H04N 1/2323 |
| 2018/0255197 A1* | 9/2018 | Oka | ...................... | H04N 1/2034 |
| 2020/0021703 A1* | 1/2020 | Kasuya | ............. | H04N 1/32673 |

* cited by examiner

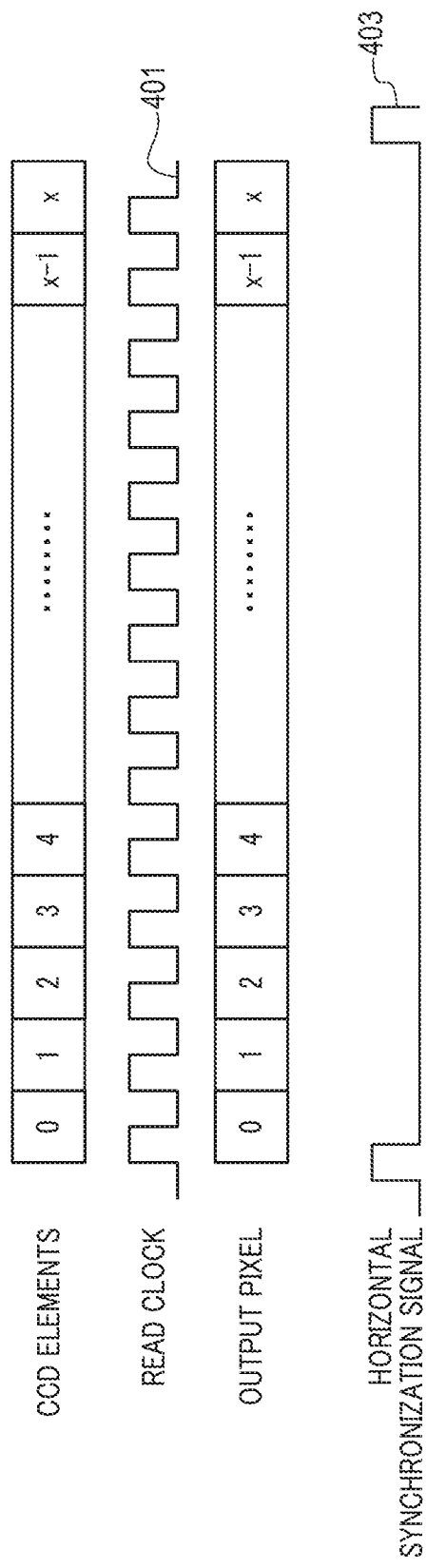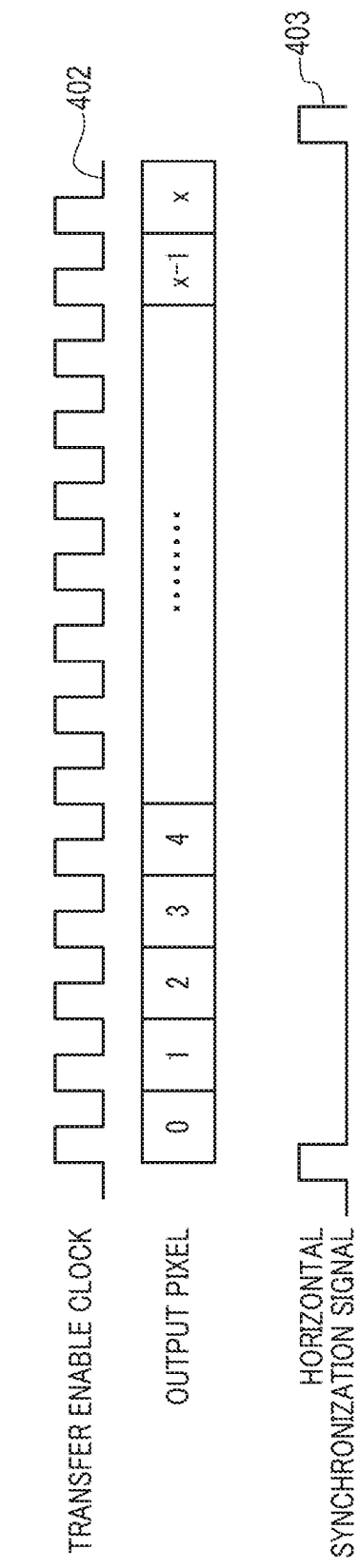

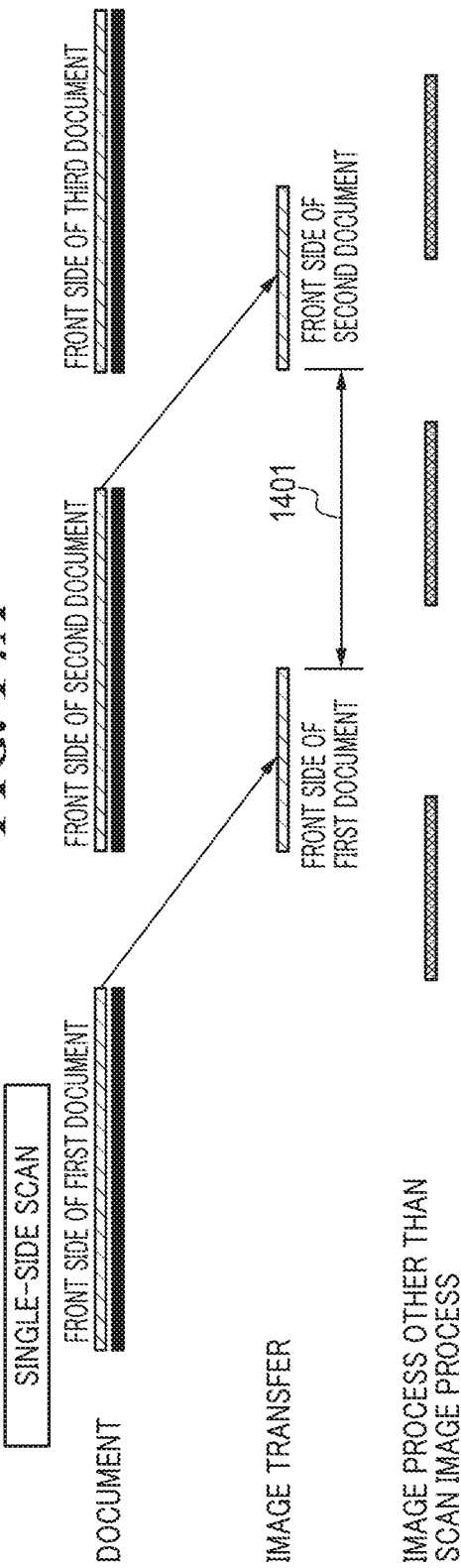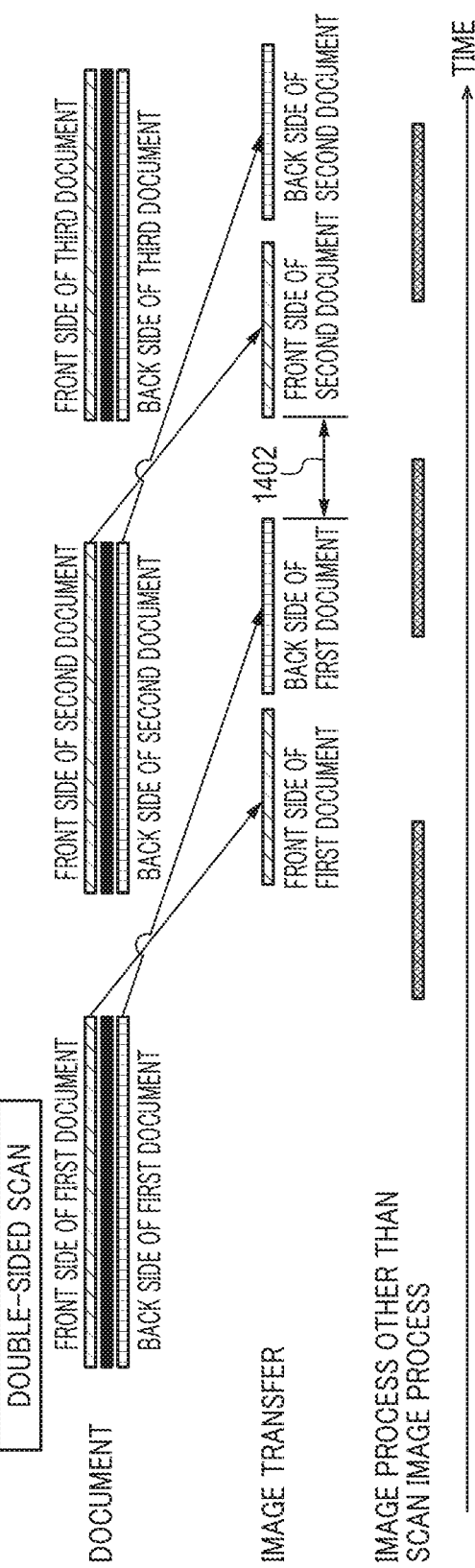

IMAGE PROCESSING APPARATUS HAVING FUNCTIONS INCLUDING SCAN FUNCTION, CONTROL METHOD THEREOF, AND STORAGE MEDIUM STORING PROGRAM FOR EXECUTING CONTROL METHOD

BACKGROUND OF THE INVENTION

Field of the Invention

The present invention relates to an image processing apparatus having functions including a scan function, a control method therefor, and a storage medium storing a program for executing the control method.

Description of the Related Art

A Multi Function Peripheral (MFP) equipped with a plurality of functions, such as a scan function and a print function, is known. A scan function of an MFP prepares several scanning speeds that are selectable according to a usage (see Japanese Laid-Open Patent Publication (Kokai) No. 2013-153521 (JP 2013-153521A)).

An MFP is provided with a controller that controls a scanner and printer of the MFP. The controller is provided with a main memory and a plurality of image processing ASICs that apply different image processes to image data. The image processing ASICs share the main memory and perform transmission and reception of image data with the main memory through an image bus. For example, when a scan job that continuously scans a plurality of documents and another job that applies an image process to image data are executed in parallel, the image processing ASICs perform data transfers in parallel with the main memory through the image bus. In this case, a data transfer amount per unit time of the image bus increases.

An upper limit that indicates the maximum data transfer amount per unit time is determined for the image bus. When the data transfer amount of the image bus exceeds the upper limit, the data transfers between the image processing ASICs and the main memory delay or stop, which interrupts executions of the scan job and the other jobs. The conventional MFP always monitors the execution statuses of the other jobs and adjusts the data transfer amount of the image bus so that the data transfer amount of the image bus does not exceed the upper limit.

However, since the conventional MFP always monitors the execution statuses of the other jobs, a problem that occupies many resources of the CPU or the memory occurs.

SUMMARY OF THE INVENTION

The present invention provides an image processing apparatus that executes jobs in parallel using a small number of resources, a control method therefor, and a storage medium storing a program for executing the control method.

Accordingly, a first aspect of the present invention provides an image processing apparatus including a controller that includes an image processor that applies an image process to image data, a scanner that scans a document, a scanner controller that includes storage for storing image data generated by scanning the document with the scanner and transfers the image data stored in the storage to the controller through a data bus, a memory device that stores a set of instructions; and at least one processor that executes the set of instructions to set a frequency of an image transfer clock to a first frequency in a case where a first job including a process that transfers image data generated by scanning documents with the scanner to the controller is executed alone, and set the frequency of the image transfer clock to a second frequency that is lower than the first frequency in a case where the first job is executed in parallel to a second job including an image process by the image processor. The frequency of the image transfer clock is maintained at the second frequency until finishing the first job.

Accordingly, a second aspect of the present invention provides a control method for an image processing apparatus including a controller that includes an image processor that applies an image process to image data, a scanner that scans a document, and a scanner controller that includes storage for storing image data generated by scanning the document with the scanner and transfers the image data stored in the storage to the controller through a data bus, the control method including setting a frequency of an image transfer clock to a first frequency in a case where a first job including a process that transfers image data generated by scanning documents with the scanner to the controller is executed alone, setting the frequency of the image transfer clock to a second frequency that is lower than the first frequency in a case where the first job is executed in parallel to a second job including an image process by the image processor, and maintaining the frequency of the image transfer clock at the second frequency until finishing the first job.

Accordingly, a third aspect of the present invention provides a non-transitory computer-readable storage medium storing a control program causing a computer to execute the control method of the second aspect.

According to the present invention, a continuous scan process and an image process are executable in parallel using a small number of resources.

Further features of the present invention will become apparent from the following description of exemplary embodiments with reference to the attached drawings.

BRIEF DESCRIPTION OF THE DRAWINGS

FIG. 4A and FIG. 4B are timing charts describing clocks used for image reading control by a contact image sensor shown in FIG. 2.

FIG. 14A and FIG. 14B are views describing congestion in the image bus of a case where two image processes are executed in parallel.

DESCRIPTION OF THE EMBODIMENTS

Figure 1:
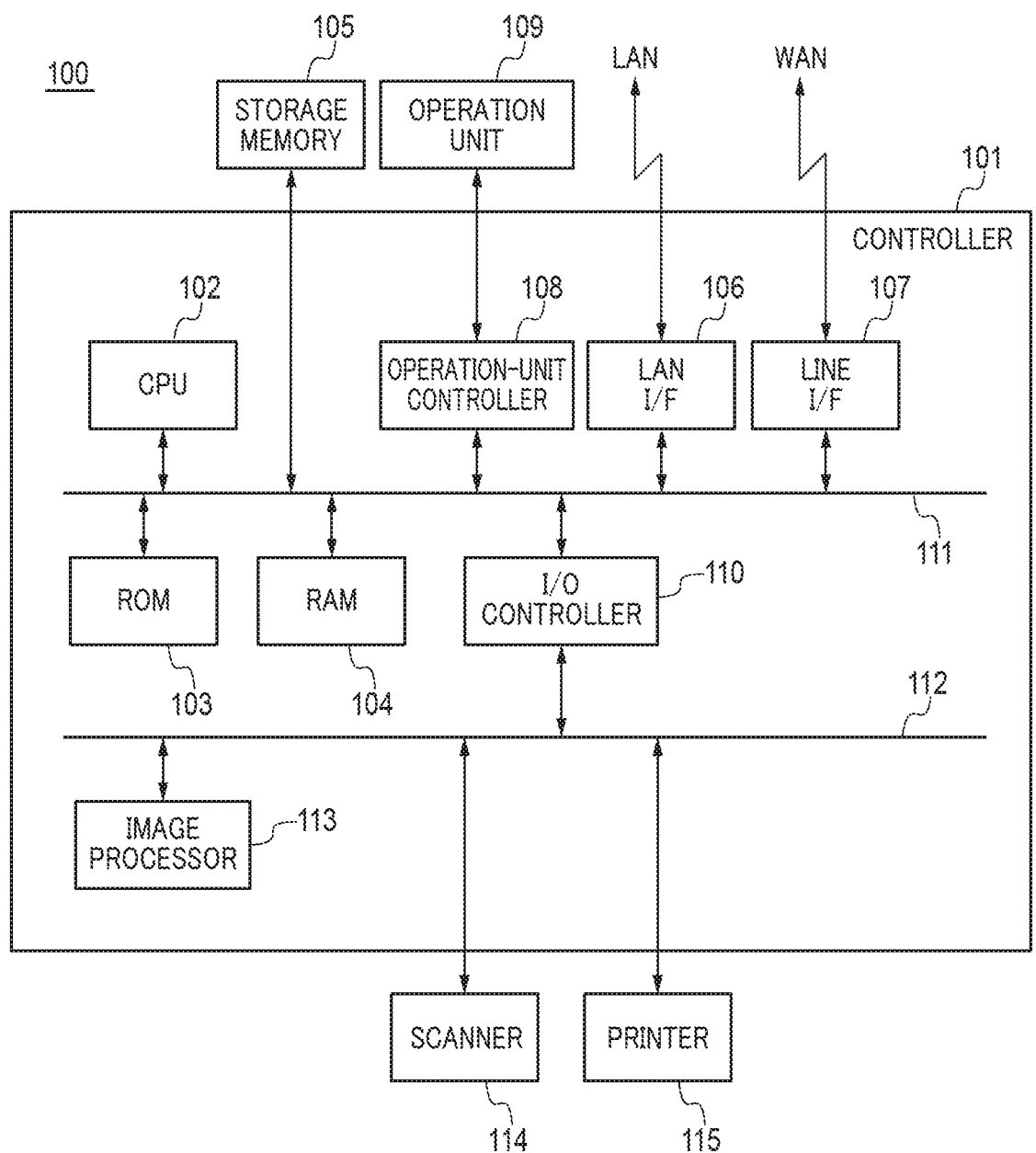
FIG. 1 is a block diagram schematically showing a configuration of an MFP concerning an embodiment of the present invention.

Hereafter, embodiments according to the present invention will be described in detail by referring to the drawings.

FIG. 1 is a block diagram schematically showing a configuration of an MFP 100 concerning an embodiment of the present invention.

As shown in FIG. 1, the MFP 100 is provided with a controller 101, a storage memory 105, an operation unit 109, a scanner 114, and a printer 115. The controller 101 is connected to the storage memory 105, operation unit 109, scanner 114, and printer 115. Moreover, the controller 101 is provided with a CPU 102, a ROM 103, a RAM 104, a LAN I/F 106, a line I/F 107, an operation-unit controller 108, an IO controller 110, and an image processor 113. The CPU 102, ROM 103, RAM 104, LAN I/F 106, line I/F 107, the operation-unit controller 108, and IO controller 110 are mutually connected through a system bus 111. The image processor 113 is connected with the IO controller 110 through an image bus (a data bus) 112.

The controller 101 totally controls the entire MFP 100. The CPU 102 runs programs stored in the ROM 103 or the storage memory 105 so as to control software modules (not shown) of the MFP 100 to execute respective processes. The ROM 103 stores a boot program for the system. The RAM 104 is a system work memory area for the CPU 102 to execute the software modules (not shown) of the MFP 100. Moreover, the RAM 104 is an image memory for storing image data temporarily when the image data is processed. The storage memory 105 consists of an HDD or an SSD (Solid State Drive) and is used as internal storage. The storage memory 105 stores a system software module that achieves functions of the MFP 100 and image data that is transferred from the RAM 104, for example.

The LAN I/F 106 is an interface for connecting the MFP 100 to a LAN. The LAN I/F 106 performs data communication with an external apparatus connected to the LAN. The line I/F 107 is an interface for connecting the MFP 100 to a WAN. The line I/F 107 performs data communication with an external apparatus connected to the WAN. The operation unit 109 consists of an LCD touch panel etc. The operation-unit controller 108 is an interface of the controller 101 and the operation unit 109. For example, the operation-unit controller 108 outputs a VGA signal to the operation unit 109 to display an image corresponding to the VGA signal on the operation unit 109. Moreover, the operation-unit controller 108 outputs information that a user inputs through the operation unit 109 to the CPU 102.

The IO controller 110 is a bus bridge that connects the system bus 111 with the image bus 112 and converts the data structure of the system bus 111. The image bus 112 consists of a general-purpose bus, such as the PCI bus, IEEE 1394, or PCIEx, and transfers image data at high speed. In addition to the IO controller 110 and the image processor 113, the scanner 114 and the printer 115 are also connected to the image bus 112. The image bus 112 converts image data between a synchronizing system and an asynchronous system. The image processor 113 consists of a plurality of ASICs as shown in the FIG. 7 mentioned later. The image processor 113 applies image processes, such as a resolution conversion process, a compression process, an expansion process, and a binary-multivalued conversion process, to image data. The scanner 114 is provided with a DF (Document Feeder) 200 in FIG. 2 and a scanner controller 300 in FIG. 3. The scanner 114 scans a document and generates image data. The printer 115 prints the image data that the scanner 114 generates.

Figure 2:
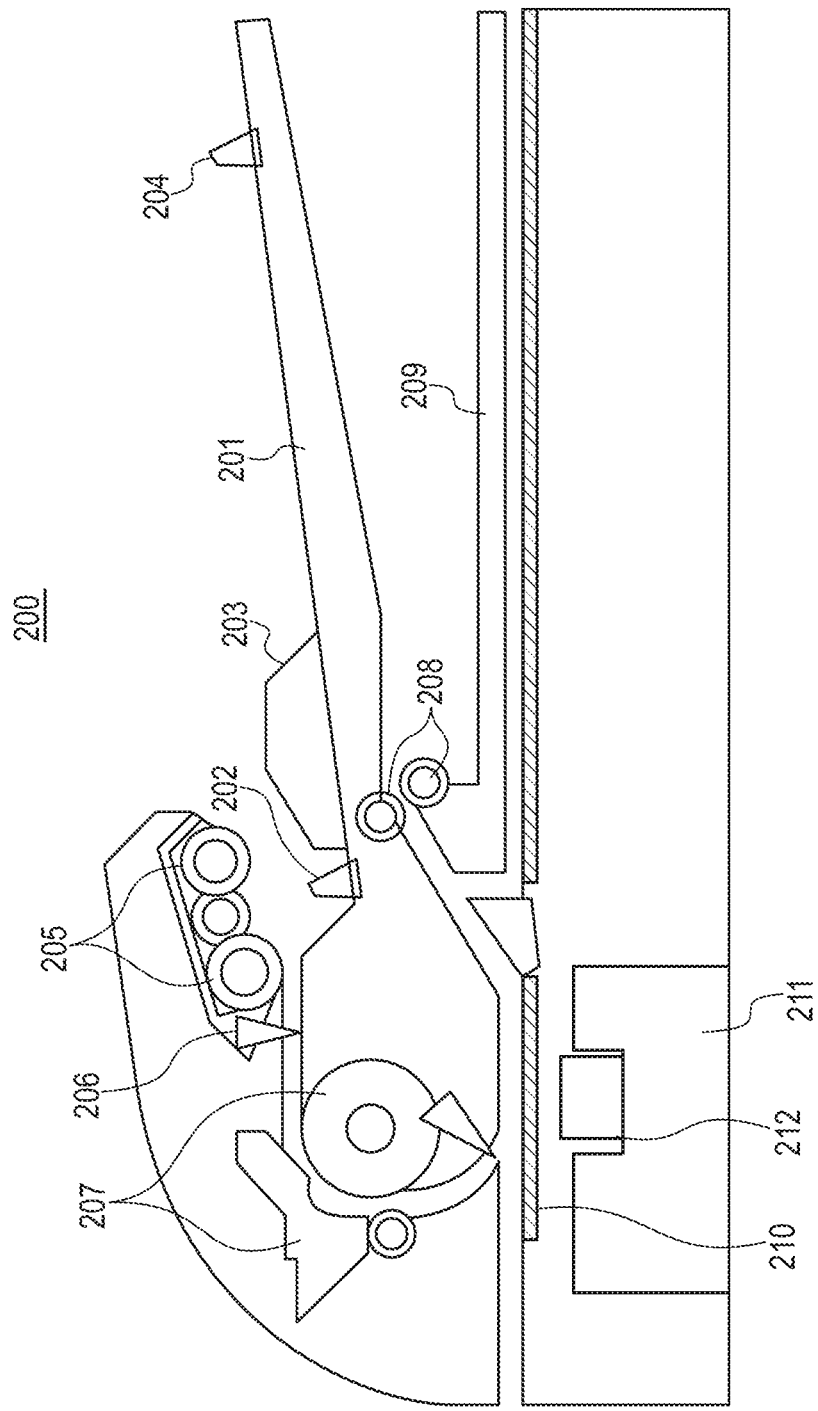
FIG. 2 is a side view showing an internal structure of a document feeder of a scanner shown in FIG. 1.

FIG. 2 is a side view showing an internal structure of the DF 200 of the scanner 114 in FIG. 1. It should be noted that FIG. 2 shows the internal structure as transparent in order to facilitate understanding.

The DF 200 is provided with a document tray 201 on which a document is placed. The document tray 201 is provided with a document sensor 202, a pair of document guides 203, and a document-size detection sensor 204. The document sensor 202 detects whether a document is placed on the document tray 201. The pair of document guides 203 are arranged so as to face each other along a direction that intersects perpendicularly with a conveyance direction of a document. The document placed on the document tray 201 is conveyed by three sets of rollers including a pickup roller pair 205, a conveyance roller 207, and a discharge roller pair 208. The pickup roller pair 205 conveys the document placed on the document tray 201 to a document conveyance path (not shown) of the DF 200. The document conveyed by the pickup roller pair 205 is detected by the document passage detection sensor 206. In DF 200, it is determined whether the first document has passed on the basis of a period that the document passage detection sensor 206 detected. The conveyance roller 207 conveys the document that is conveyed to the document conveyance path by the pickup roller pair 205 to the document discharge roller pair 208. The discharge roller pair 208 conveys the document that is conveyed by the conveyance roller 207 to the document discharge tray 209. It should be noted that the pickup roller pair 205, the conveyance roller 207, and the discharge roller pair 208 are driven with a stepping motor (not shown).

A sensor unit 211 scans (reads) the document conveyed to the above-mentioned document conveyance path when the document passes a transparent DF scan window 210 provided in the document conveyance path concerned. The sensor unit 211 is provided with a CIS (Contact Image Sensor) 212. The document conveyed to the above-mentioned document conveyance path is arranged at a position that the sensor unit 211 is able to read through the DF scan window 210. The sensor unit 211 is movable in a subscanning direction. For example, the sensor unit 211 moves in the same direction as the conveyance direction of the document conveyed from the conveying roller 207 to the discharge roller pair 208. It should be noted that the DF scan window 210 has a certain length in the subscanning direction. The CIS 212 can move to an arbitrary position within the length and can scan a document at the moved position. The CIS 212 consists of a plurality of photoelectric conversion elements, for example, CCD elements. The CCD elements are linearly arranged in the CIS 212. The CIS 212 generates a control signal for controlling FIFO for storing pixel signals read by the CCD elements.

Figure 3:
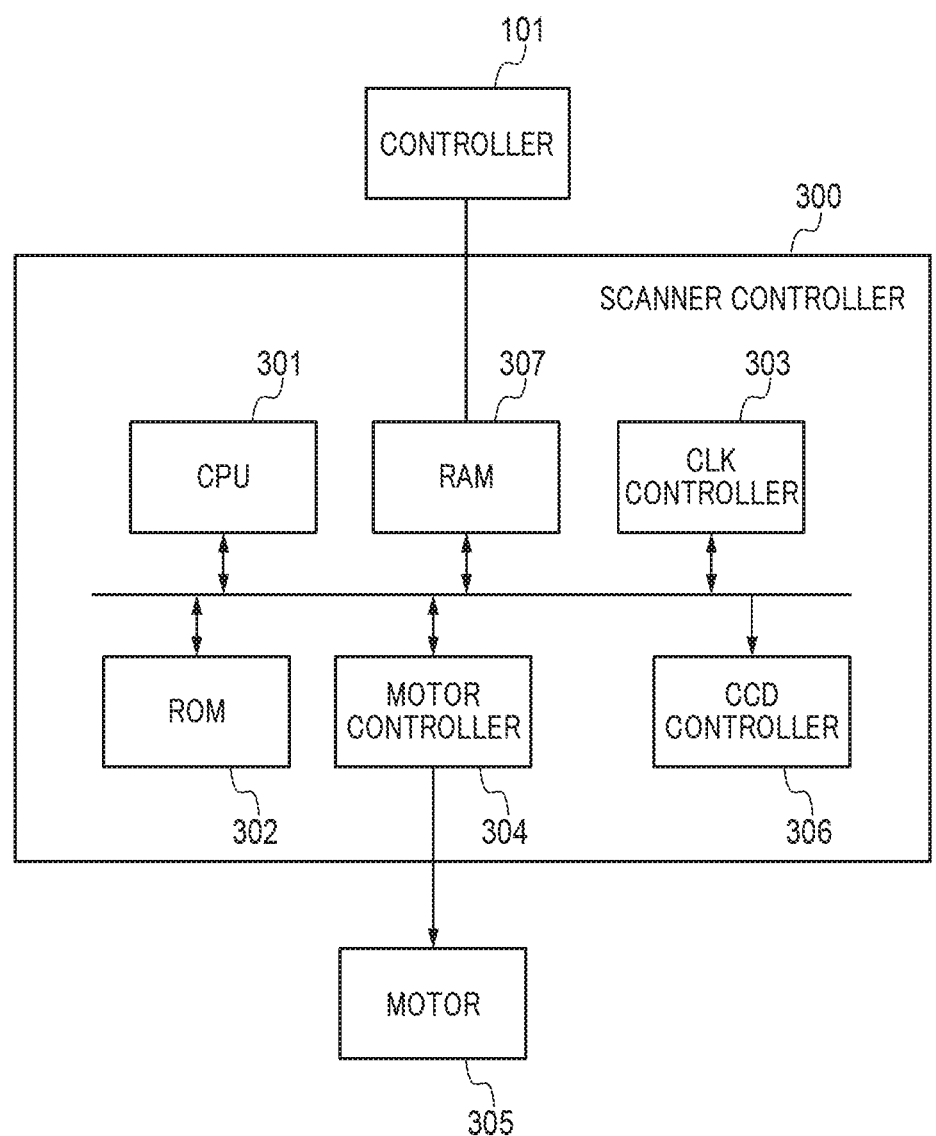
FIG. 3 is a block diagram schematically showing a configuration of a scanner controller of the scanner shown in FIG. 1.

FIG. 3 is a block diagram schematically showing a configuration of the scanner controller 300 of the scanner 114 shown in FIG. 1.

As shown in FIG. 3, the scanner controller 300 is provided with a CPU 301, ROM 302, CLK (clock) controller 303, motor controller 304, CCD controller 306, and RAM 307.

The scanner controller 300 controls operations of the scanner 114 by controlling the CPU 301 to run a scanner control application program (not shown) stored in the ROM 302. The scanner control application program activates a scanner control application (not shown) that controls the scanner controller 300. Although a case where the CPU 301 runs the scanner control application program will be described in this embodiment, a device that runs the scanner control application program is not limited to the CPU 301. For example, the CPU 102 of the controller 101 may run the scanner control application program to control the operations of the scanner 114.

The CLK controller 303 supplies a clock to devices that constitute the scanner controller 300. The clock is used for generating an image transfer clock mentioned later too. The CLK controller 303 consists of a crystal oscillator (not shown) that generates a clock and a PLL (not shown). The PLL multiplies or divides the clock that the crystal oscillator generates. When a scan execution instruction is received from a user, the CLK controller 303 outputs the clock to the motor controller 304, CCD controller 306, and RAM 307 in the scanner 114. For example, the motor controller 304 generates a control clock for the motor 305 that rotates the rollers on the basis of the clock received from the CLK controller 303. The scan execution instruction includes information, such as a distinction between color and monochrome and a resolution. The scanner control application changes a setting of the PLL in the CLK controller 303 on the basis of contents of the instruction. The CLK controller 303 controls the frequency of the output clock on the basis of the setting of the PLL. Thereby, the scanning speed of the scanner 114 is changed. The RAM 307 stores the image data of the document that the CIS 212 reads. The RAM 307 has a capacity to store image data of four pages of a A4 size document.

The scanner controller 300 controls reading of the image by the CIS 212 on the basis of a read clock 401 in FIG. 4A and a transfer enable clock 402 in FIG. 4B. The read clock 401 is a clock signal for reading pixel signals that constitute image data from the respective CCD elements. The transfer enable clock 402 is the image transfer clock. The image transfer clock is a clock signal for controlling whether the read pixel signals are transferred to the controller 101. The scanner controller 300 reads a pixel signal from each CCD element at a rising edge of the read clock 401 starts up. The pixel signals read from the respective CCD elements are stored in the RAM 307. Moreover, the scanner controller 300 transfers the pixel signals stored in the RAM 307 to the controller 101 in synchronization with the rising edge of the transfer enable clock 402 controlled on the basis of a horizontal synchronization signal 403 in FIG. 4A. The horizontal synchronization signal 403 is a clock signal that controls a taking start of a line of the CCD sensor.

Moreover, the scanner controller 300 generates the PWM signal for the motor that drives the pickup roller pair 205, conveyance roller 207, and discharge roller pair 208 that are provided in the scanner 114 in synchronization with the horizontal synchronization signal 403. The MFP 100 shortens the cycle of the horizontal synchronization signal 403, when performing a high-speed scanning. Thereby, rotational speeds of the pickup roller pair 205, conveyance roller 207, and discharge roller pair 208 increase relatively, which speeds up the conveyance of the document, shortening the scan time per one document. Moreover, the scanner controller 300 raises the frequency of the read clock 401 according to the document scanning speed in order to shorten read time from the CCD elements. The scanner controller 300 stores the pixel signals to the RAM 307 according to the cycle of the read clock 401. Moreover, the scanner controller 300 raises the frequency of the transfer-enable clock 402 in response to the control of the frequency of the read clock 401, which shortens a time needed for transferring the pixel signals to the controller 101 from the RAM 307.

Figure 5:
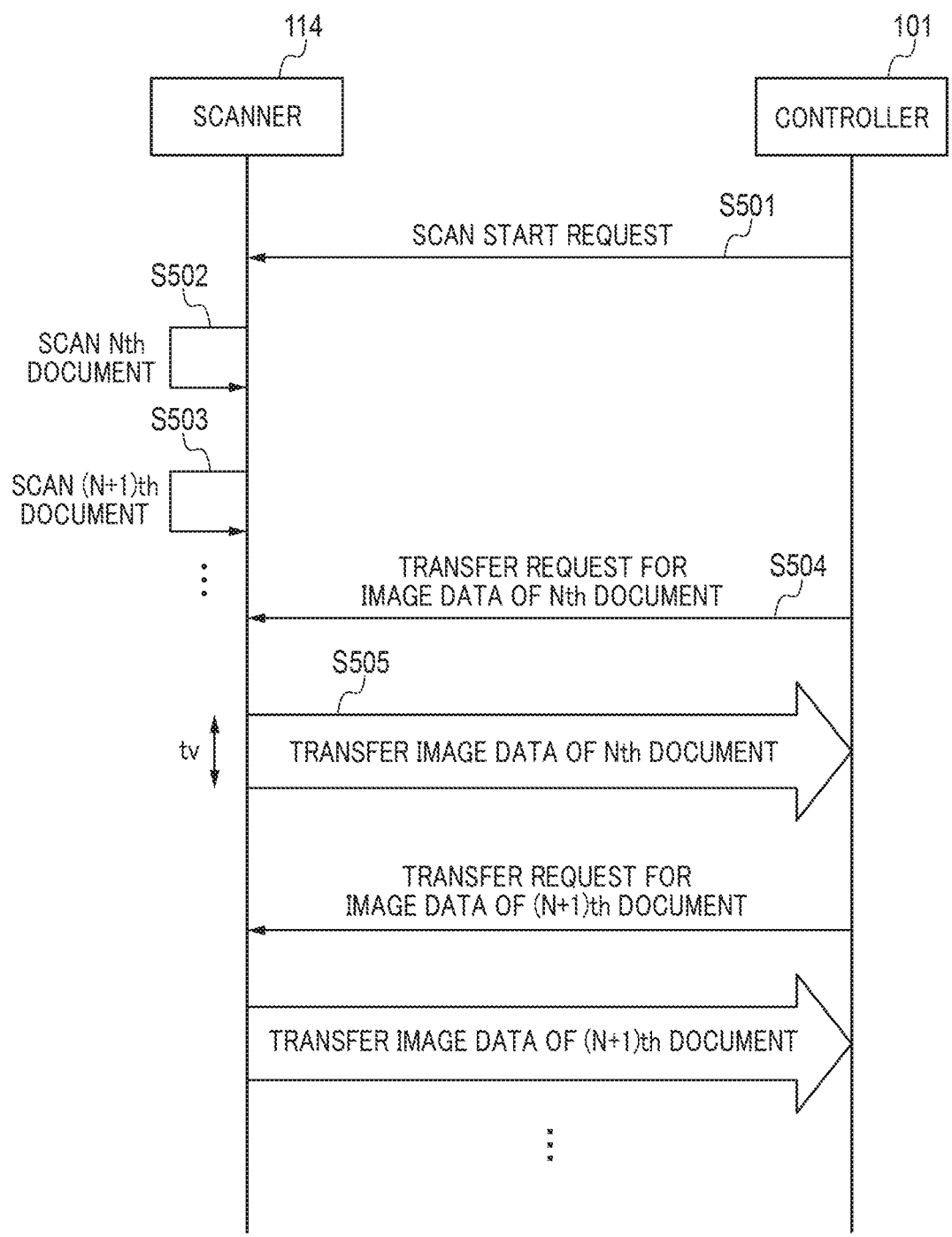
FIG. 5 is a sequence chart about an image scan operation executed by the MFP of FIG. 1.

FIG. 5 is a sequence chart about an image scan operation executed by the MFP 100 of FIG. 1. The scan operation in FIG. 5 is executed by the above-mentioned scanner control application that controls the scanner 114 and a job control application (not shown) that controls the controller 101.

As shown in FIG. 5, when receiving a scan start request from the controller 101 (step S501), the scanner 114 scans the Nth document according to the read clock 401 (step S502). The image data of the Nth document consists of a plurality of pixel signals read by the CCD elements is stored in the RAM 307. When scanning of the Nth document is completed, the scanner 114 scans the next ((N+1)th) document (step S503).

Figure 6:
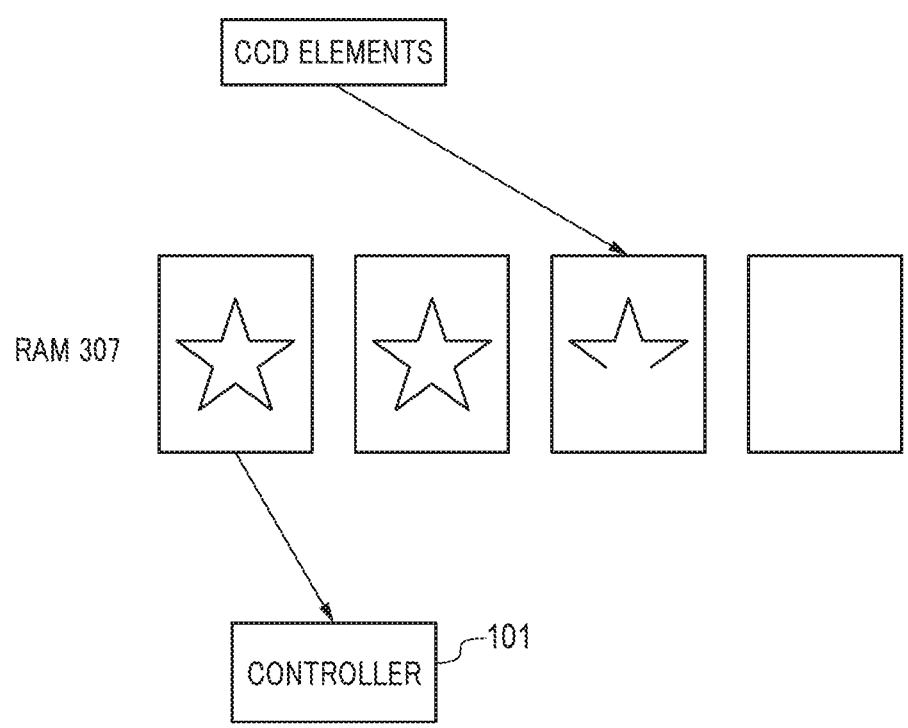
FIG. 6 is a view describing transfer of image data from a RAM to a controller shown in FIG. 3.

In the meantime, when receiving a transfer request for the image data of the Nth document from the controller 101 (step S504), the scanner 114 transfers the image data of the Nth document to the controller 101 according to the transfer enable clock 402 (step S505). When the frequency of the transfer enable clock 402 becomes higher, the image transfer time tv is shortened and the scanning speed increases. The image data that has been transferred to the controller 101 is deleted from the RAM 307. Since the RAM 307 cannot store the image data of more than four pages, the MFP 100 is controlled so that the image data stored in the RAM 307 will be transferred to the controller 101 before using up the memory area of the RAM 307 as shown in FIG. 6.

Figure 7:
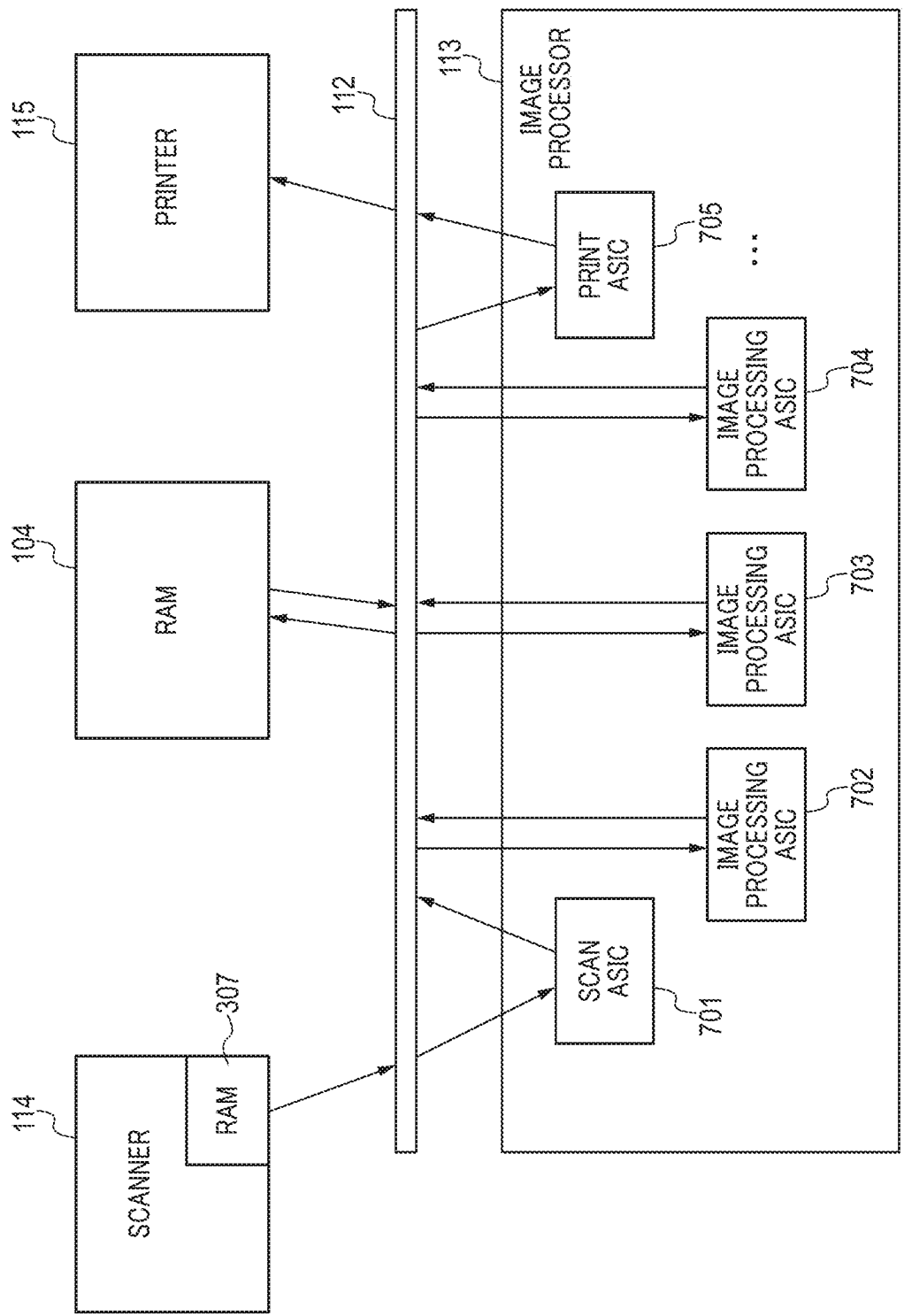
FIG. 7 is a block diagram schematically showing a configuration of an image processor shown in FIG. 1.

FIG. 7 is a block diagram schematically showing a configuration of the image processor 113 shown in FIG. 1. As shown in FIG. 7, the image processor 113 is provided with ASICs 701 through 705 that apply different image processes, such as a resolution conversion process, a compression process, an extension process, and a binary-multi-valued conversion process, to image data. The ASICs 701 through 705 share the RAM 104 and transfer data through the image bus 112. The image processor 113 is able to execute image processes in parallel by using the ASICs 701 through 705. For example, the ASIC 701 executes a scan image process in parallel to another image process, which is different from the scan image process, executed by the ASIC 702. The scan image process includes a process that obtains image data from the scanner 114 through the image bus 112, a process that applies image processes to the obtained image data, and a process that stores the processed image data in the RAM 104 through the image bus 112.

Figure 8:
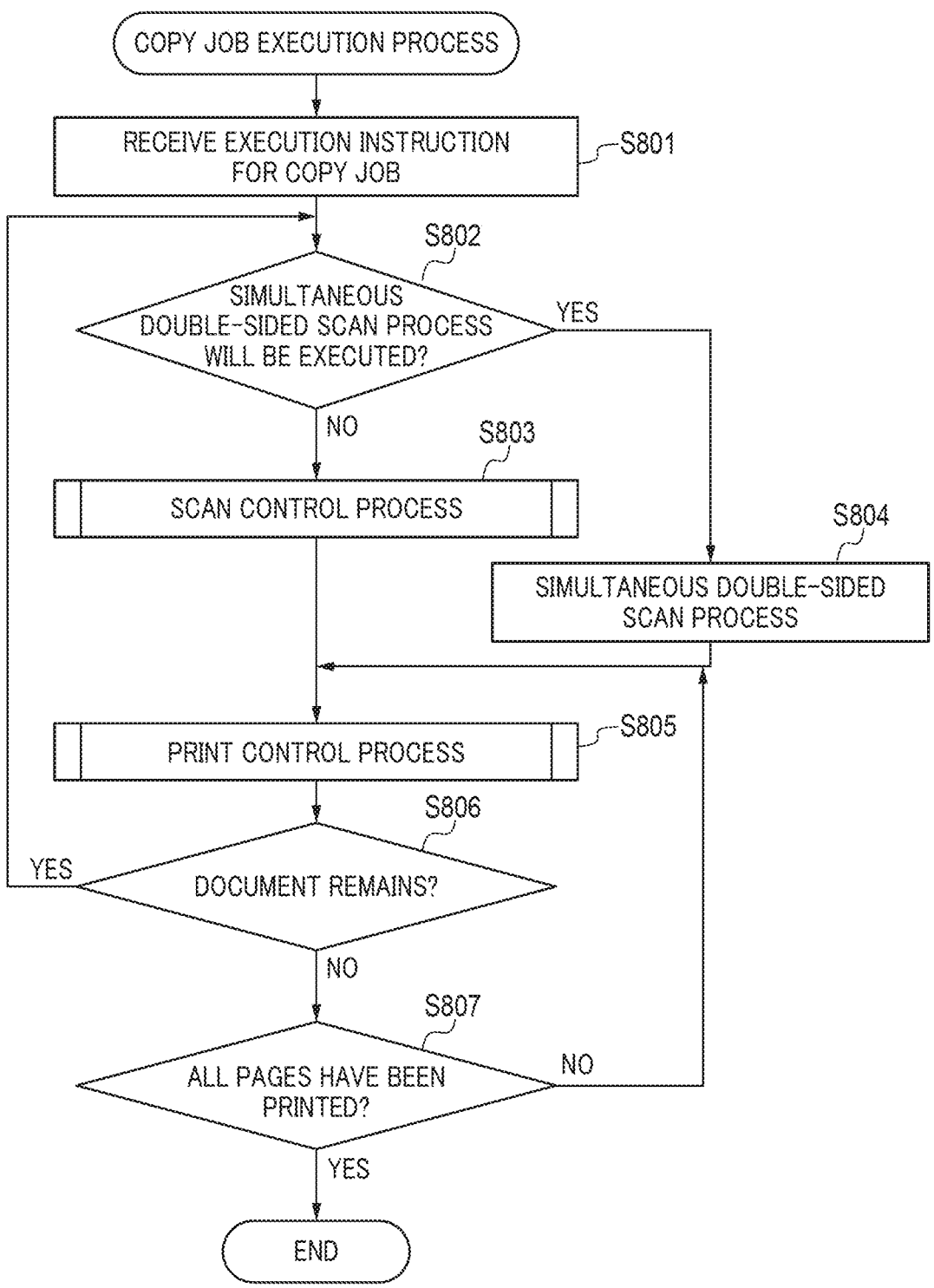
FIG. 8 is a flowchart showing procedures of a copy job execution process executed by the MFP of FIG. 1.

Next, execution of a copy job that consists of a scan process and a print process will be described. FIG. 8 is a flowchart showing procedures of a copy job execution process executed by the MFP 100 of FIG. 1. The process of FIG. 8 is performed when the CPU 102 runs the program stored in the ROM 103 etc.

As shown in FIG. 8, when receiving an execution instruction for a job of copy setting that a user inputs through the operation unit 109 (hereinafter referred to as a "copy job") in step S801, the CPU 102 performs a process of step S802. In the step S802, the CPU 102 determines whether a simultaneous double-sided scan process that scans both sides (front and back sides) of a document simultaneously will be executed on the basis of the above-mentioned copy setting.

As a result of the determination in the step S802, when the simultaneous double-sided scan process will not be executed, the CPU 102 executes a scan control process of FIG. 9 mentioned later (step S803), scans one side of the document, and generates image data of one page. Next, the CPU 104 performs the process of step S805.

As a result of the determination in the step S802, when the simultaneous double-sided scan process will be executed, the CPU 102 executes the simultaneous double-sided scan process on the basis of the above-mentioned copy setting (step S804), scans both sides of the document, and generates image data of two pages. Next, the CPU 102 executes a print control process of FIG. 10 mentioned later (step S805). When the copy job received in the step S801 is a job that copies two or more documents, the CPU 102 performs the processes of the steps S802 through S805 for every document. Next, the CPU 102 determines whether the document remains on the DF 200 (step S806).

As a result of the determination in the step S806, when the document remains on the DF 200, the CPU 102 returns the process to the step S802. As a result of the determination in the step S806, when no document remains on the DF 200, the CPU 102 determines whether all the pages have been printed (step S807).

As a result of the determination in the step S807, when at least one page has not been printed, the CPU 102 returns the process to the step S805. As a result of the determination in the step S807, when all the pages have been printed, the CPU 102 finishes this process.

Figure 9:
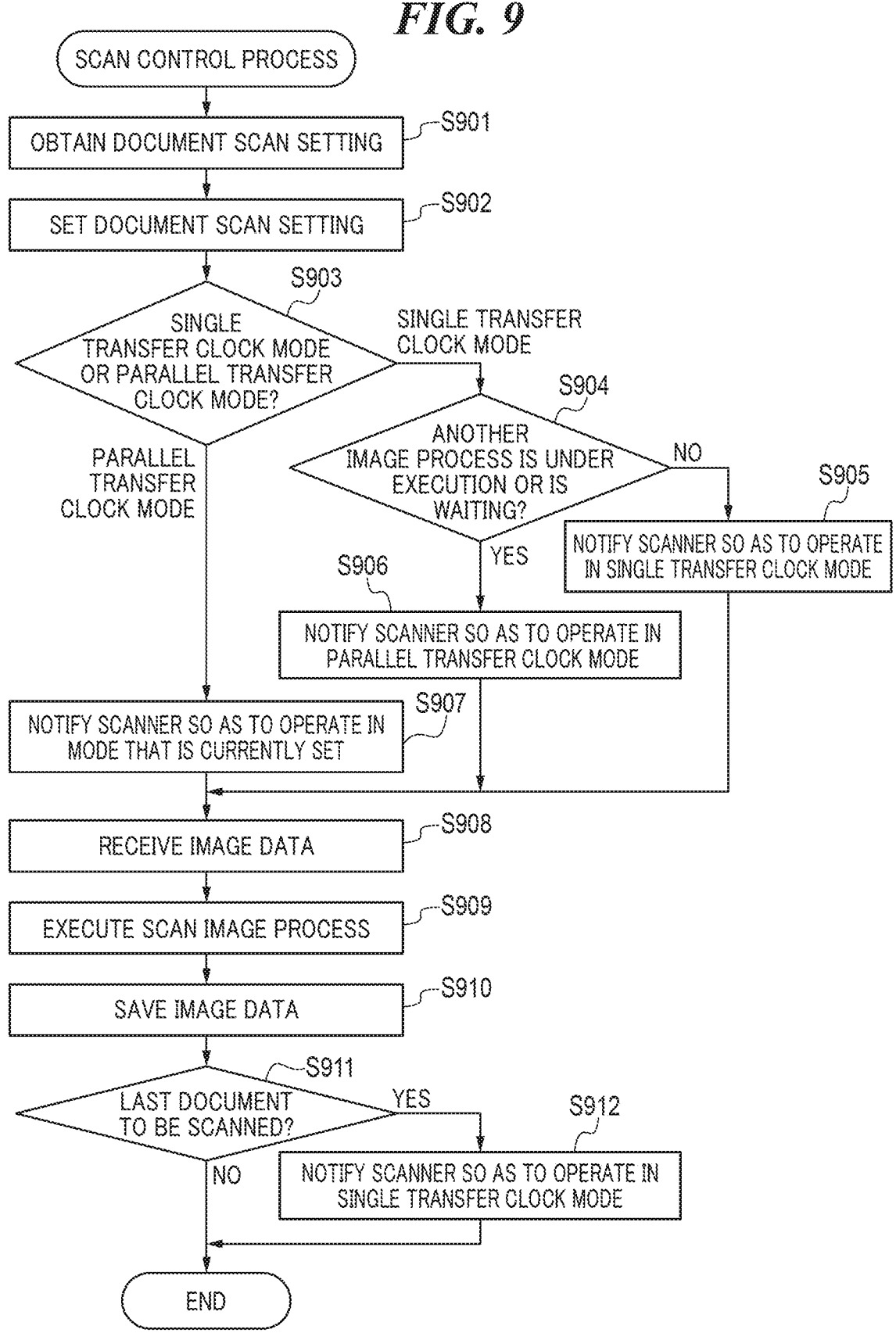
FIG. 9 is a flowchart showing procedures of a scan control process executed in step S803 in FIG. 8.

FIG. 9 is a flowchart showing procedures of the scan control process executed in the step S803 in FIG. 8. When the copy job received in the step S801 is a job that copies two or more documents, for example, the process of FIG. 9 is executed for every document.

As shown in FIG. 9, the CPU 102 obtains the document scan setting of the copy job set through the operation unit 109 (step S901). Next, the CPU 102 selects the ASIC that will execute the scan image process corresponding to the obtained document scan setting from among the ASICs 701 through 705 in the image processor 113, and sets the document scan setting to the selected ASIC (step S902). Next, the CPU 102 determines whether the operation mode of the scanner 114 is a single transfer clock mode or a parallel transfer clock mode (step S903). In the embodiment, the scanner 114 operates in the single transfer clock mode or the parallel transfer clock mode.

In the single transfer clock mode, the CLK controller 303 sets the frequency of the transfer enable clock 402 to a predetermined frequency (first frequency). The scanner 114 transfers image data to the controller 101 by the transfer enable clock 402 of the set-up first frequency. The standard setting of the transfer clock mode in the embodiment is the single transfer clock mode. The scanner 114 operates in the single transfer clock mode as the standard setting when starting execution of a job or when executing a job alone, for example.

In the parallel transfer clock mode, the CLK controller 303 sets the frequency of the transfer enable clock 402 to a second frequency being lower than the first frequency. The scanner 114 transfers image data to the controller 101 by the transfer enable clock 402 of the set-up second frequency. In the embodiment, the scanner 114 operates in the parallel transfer clock mode when executing different jobs accompanying the data transfer through the image bus 112 in parallel, for example. When the single transfer clock mode is switched to the parallel transfer clock mode, the number of the transfer enable clocks 402 per unit time in the scan image process decreases, which reduces the data transfer amount per unit time through the image bus 112.

As a result of the determination in the step S903, when the operation mode of the scanner 114 is the single transfer clock mode, the CPU 102 determines whether another image process by an ASIC other than the selected ASIC is under execution or is waiting (step S904). Another image process is a RIP process, a send process, or a facsimile process, for example. The send process converts a data format of the image data stored in the storage memory 105 into JPEG, PDF, or the like. The facsimile process converts the data format of the image data into an image format suitable to facsimile transmission.

As a result of the determination in the step S904, when another image process is not under execution and is not waiting, the CPU 102 notifies the scanner 114 so as to operate in the single transfer clock mode (step S905). Next, the CPU 102 performs a process of step S908 mentioned later.

As a result of the determination in the step S904, when another image process is under execution or is waiting, the CPU 102 notifies the scanner so as to operate in the parallel transfer clock mode (step S906), and performs the process of the step S908.

As a result of the determination in the step S903, when the scanner 114 is in the parallel transfer clock mode, the CPU 102 does not execute the process of the step S904. The CPU 102 notifies the scanner 114 so as to operate in the mode that is currently set, i.e., in the parallel transfer clock mode (step S907). That is, when the clock mode is switched from the single transfer clock mode as the standard setting to the parallel transfer clock mode while executing a job in the embodiment, the MFP 100 maintains the parallel transfer clock mode until completing execution of the job concerned. Moreover, in this case, the MFP 100 does not execute the determination process of the step S904 that monitors an execution situation of another job different from the above-mentioned job until completing execution of the above-mentioned job.

Next, the CPU 102 receives image data from the scanner 114 (step S908). Next, the CPU 102 applies the scan image process to the received image data by the ASIC to which the document scan setting is set (step S909). Next, the CPU 102 saves the image data, which has been subjected to the scan image process, into the RAM 104 (step S910) and determines whether the scan target is the last scan document (step S911).

As a result of the determination in the step S911, when the scan target is not the last scan document, the CPU 102 finishes this process and executes the scan control process to the following document.

As a result of the determination in the step S911, when the scan target is the last scan document, the CPU 102 notifies the scanner 114 so as to operate in the single transfer clock mode (step S912) and finishes this process.

Although the case where the scan control process is executed as the process of the step S803 is described in the embodiment, the scan control process may be executed when an execution instruction for a scan job is received from a user. For example, when receiving an execution instruction for a scan job including a continuous scan process that continuously scans two or more documents, the MFP 100 executes the scan control process for every document.

Figure 10:
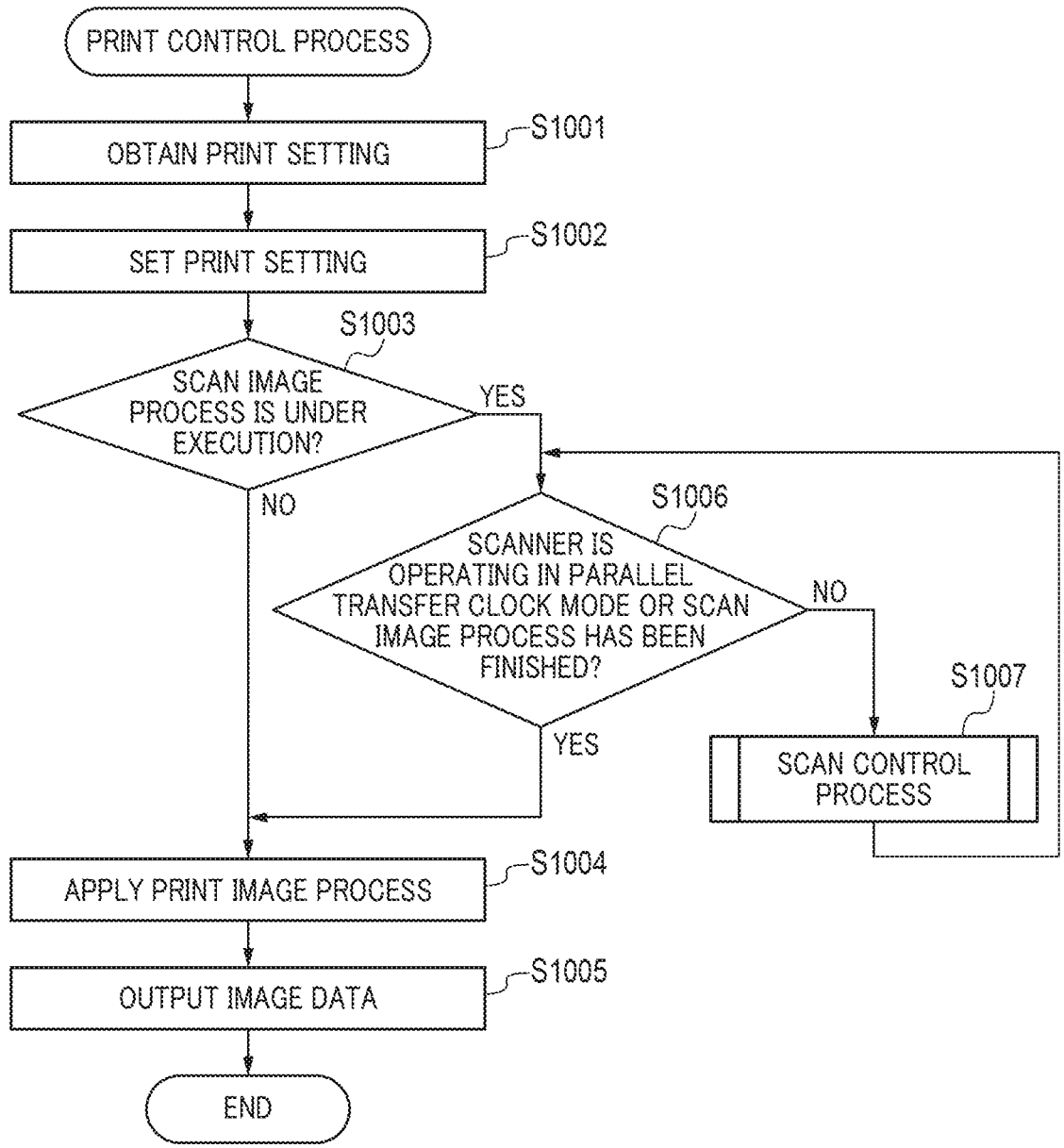
FIG. 10 is a flowchart showing procedures of a print control process executed in step S805 in FIG. 8.

FIG. 10 is a flowchart showing procedures of the print control process executed in the step S805 in FIG. 8.

As shown in FIG. 10, the CPU 102 obtains a print setting of the copy job set through the operation unit 109 (step S1001). Next, the CPU 102 selects the ASIC that will execute the print image process corresponding to the obtained print setting from among the ASICs 701 through 705 in the image processor 113, and sets the print setting to the selected ASIC (step S1002). The print image process includes the RIP process mentioned above, for example. Next, the CPU 102 determines whether the scan image process is under execution (step S1003).

As a result of the determination in the step S1003, when the scan image process is not under execution, the CPU 102 applies the print image process to the image data stored in the RAM 104 by the ASIC to which the print setting is set (step S1004). Next, the CPU 102 outputs the image data, which has been subjected to the print image process, to the printer 115 (step S1005) and finishes this process.

As a result of the determination in the step S1003, when the scan image process is under execution, the CPU 102 determines whether the scanner 114 is operating in the parallel transfer clock mode or whether the scan image process has been finished (step S1006).

As a result of the determination in the step S1006, when the scanner 114 does not operate in the parallel transfer clock mode and the scan image process has not been finished, the CPU 102 executes the scan control process mentioned above (step S1007). After finishing the process of the step S1007, the CPU 102 returns the process to the step S1006.

As a result of the determination in the step S1006, when the scanner 114 operates in the parallel transfer clock mode or the scan image process has been finished, the CPU 102 performs the process from the step S1004.

According to the embodiment mentioned above, when a scan job is performed in parallel to another job including an image process by the image processor 113, the frequency of the transfer enable clock 402 is set to the second frequency being lower than the first frequency. The frequency of the transfer enable clock 402 is maintained at the second frequency until finishing the scan job. That is, after the MFP 100 sets the frequency of the transfer enable clock 402 to the second frequency because it is determined that the scan job is executed in parallel to another job, the MFP 100 does not monitor the execution situation of the other job until finishing the scan job concerned. Thereby, the resource for monitoring the execution situation of another job during execution of the scan job becomes unnecessary, which enables execution of the jobs in parallel using the minimum resources.

Moreover, when the other job executed in parallel to the scan job is finished, the frequency of the transfer enable clock 402 is maintained at the second frequency until finishing the scan job in the embodiment mentioned above. That is, the resource for switching the frequency of the transfer enable clock 402 becomes unnecessary after the frequency of the transfer enable clock 402 is set to the second frequency because the other job is executed in parallel to the scan job until finishing the scan job concerned. This reduces the resource that switches the frequency of the transfer enable clock 402.

In the embodiment mentioned above, when the scan job is finished, the frequency of the transfer enable clock 402 is set to the first frequency. Thereby, the frequency of the transfer enable clock 402 used by another scan job that will be executed next to the scan job concerned is returned to the first frequency as the standard setting.

In the embodiment mentioned above, the image processor 113 performs the data transfer with the scanner 114, RAM 104, and printer 115 through the image bus 112. Thereby, jobs are executable in parallel using the minimum resources in the configuration mentioned above.

Figure 11:
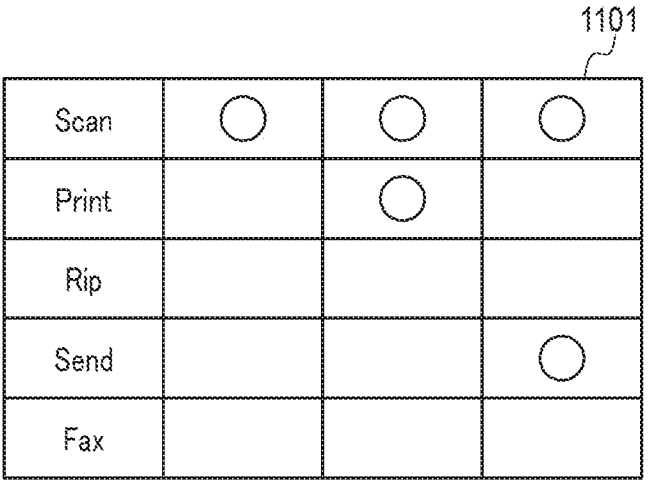
FIG. 11 is a view showing examples of combinations of image processes that are executable in parallel in a single transfer clock mode.

Although the present invention is described with the embodiment mentioned above, the present invention is not limited to the embodiment mentioned above. For example, when another image process is executed in parallel to the scan image process, the scanner 114 may operate in the single transfer clock mode. For example, as shown by combination examples in FIG. 11, when the scan image process is executed in parallel to the print image process, or when the scan image process is executed in parallel to the send process, the data transfer amount through the image bus 112 does not exceed a transferable upper limit even if the scanner 114 operates in the single transfer clock mode. In such a case, the MFP 100 operates the scanner 114 in the single transfer clock mode.

Figure 12:
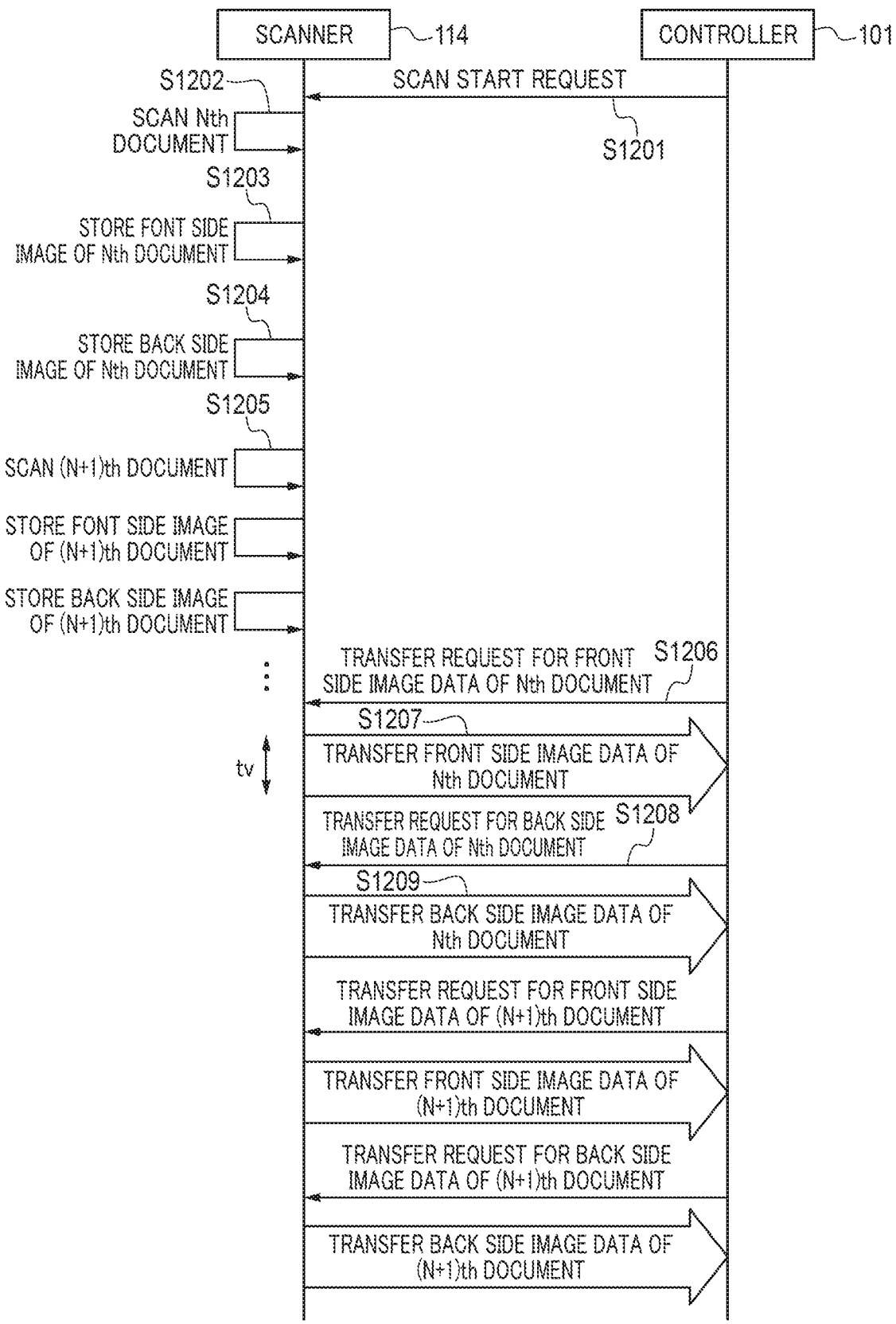
FIG. 12 is a sequence chart about a simultaneous double-sided image scan operation executed by the MFP of FIG. 1.

Next, a parallel execution of the simultaneous double-sided scan process and another image process will be described. FIG. 12 is a sequence chart about the simultaneous double-sided image scan operation executed by the MFP 100 of FIG. 1. The simultaneous double-sided image scan operation in FIG. 12 is also executed by the above-mentioned scanner control application and the above-mentioned job control application as with the scan operation in FIG. 5.

As shown in FIG. 12, when receiving a scan start request from the controller 101 (step S1201), the scanner 114 scans front and back sides of the Nth document according to the read clock 401 (step S1202). The image data of the front and back sides of the Nth document that consist of pixel signals read by the respective CCD elements are stored in the RAM 307 (steps S1203 and S1204). When scanning of the Nth document is completed, the scanner 114 scans the front and back sides of the next ((N+1)th) document (step S1205).

In the meantime, when receiving a transfer request for the image data of the front side of the Nth document from the controller 101 (step S1206), the scanner 114 transfers the image data of the front side of the Nth document to the controller 101 according to the transfer enable clock 402 (step S1207). Moreover, when receiving a transfer request for the image data of the back side of the Nth document from the controller 101 (step S1208), the scanner 114 transfers the image data of the back side of the Nth document to the controller 101 according to the transfer enable clock 402 (step S1209). When the frequency of the transfer enable clock 402 becomes higher, the image transfer time tv is shortened and the scanning speed increases. The image data that has been transferred to the controller 101 is deleted from the RAM 307. Since the RAM 307 cannot store the image data of more than four pages as mentioned above, the MFP 100 is controlled so that the image data stored in the RAM 307 will be transferred to the controller 101 before using up the memory area of the RAM 307.

Figure 13:
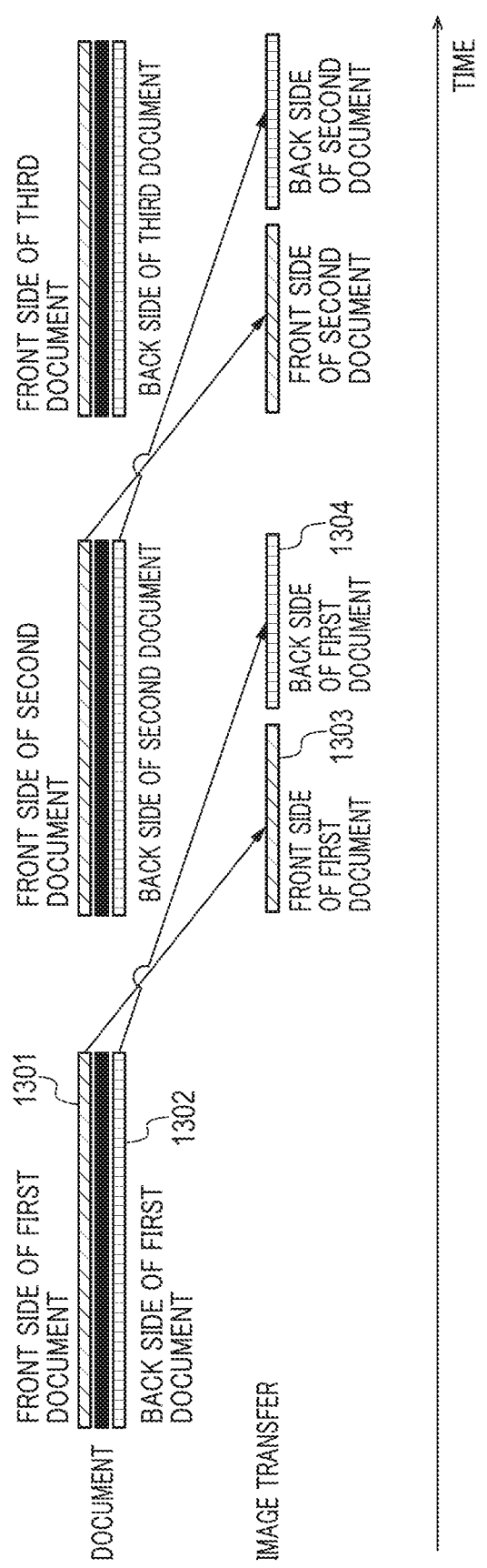
FIG. 13 is a view describing transfers of image data obtained by the simultaneous double-sided image scan operation of the scanner shown in FIG. 1.

FIG. 13 is a view describing transfers of image data obtained when the scanner 114 shown in FIG. 1 executes the simultaneous double-sided scan process. The scanner 114 scans both of front and back sides 1301 and 1302 of one document by one conveyance of the document. The scanner 114 transfers the image data 1303 and 1304 of two pages that are obtained by scanning the front side 1301 and the back side 1302 to the controller 101. When the transfer time during which the scanner 114 transfers the image data of two pages to the controller 101 falls within the document conveyance period for one document, the MFP 100 is able to execute the simultaneous double-sided scan process without reducing the original conveyance speed.

For example, in a process that scans only one side of each document, there is a period 1401 during which no data is transferred through the image bus 112 between a transfer period for image data of a first document and a transfer period for image data of a second document, as shown in FIG. 14A. Even if another image process transfers data through the image bus 112 during the period 1401, the image bus 112 is not congested.

In the meantime, since it is necessary to transfer image data of two pages within the document conveyance period for one document in the simultaneous double-sided scan process, a period 1402 in FIG. 14B during which no data is transferred through the image bus 112 is shorter than the period 1401. Accordingly, as shown in FIG. 14B, a possibility that the data transfer through the image bus 112 by the simultaneous double-sided scan process is performed in parallel to the data transfer through the image bus 112 by another image process becomes extremely high. When the data transfer through the image bus 112 by the simultaneous double-sided scan process is performed in parallel to the data transfer through the image bus 112 by another image process, the image bus 112 is congested and a risk of exceeding the transferable upper limit value of the image bus 112 increases. In the process that scans only one side of each document, the setting of the transfer enable clock 402 is required once for transfer of image data of one document. Against this, in the simultaneous double-sided scan process, the setting of the transfer enable clock 402 is required twice for transfer of image data of one document because the setting is required for the front and back sides. Accordingly, the simultaneous double-sided scan process needs more resources for switching the setting of the transfer enable clock 402 as compared with the process that scans only one side of a document.

Figure 15:
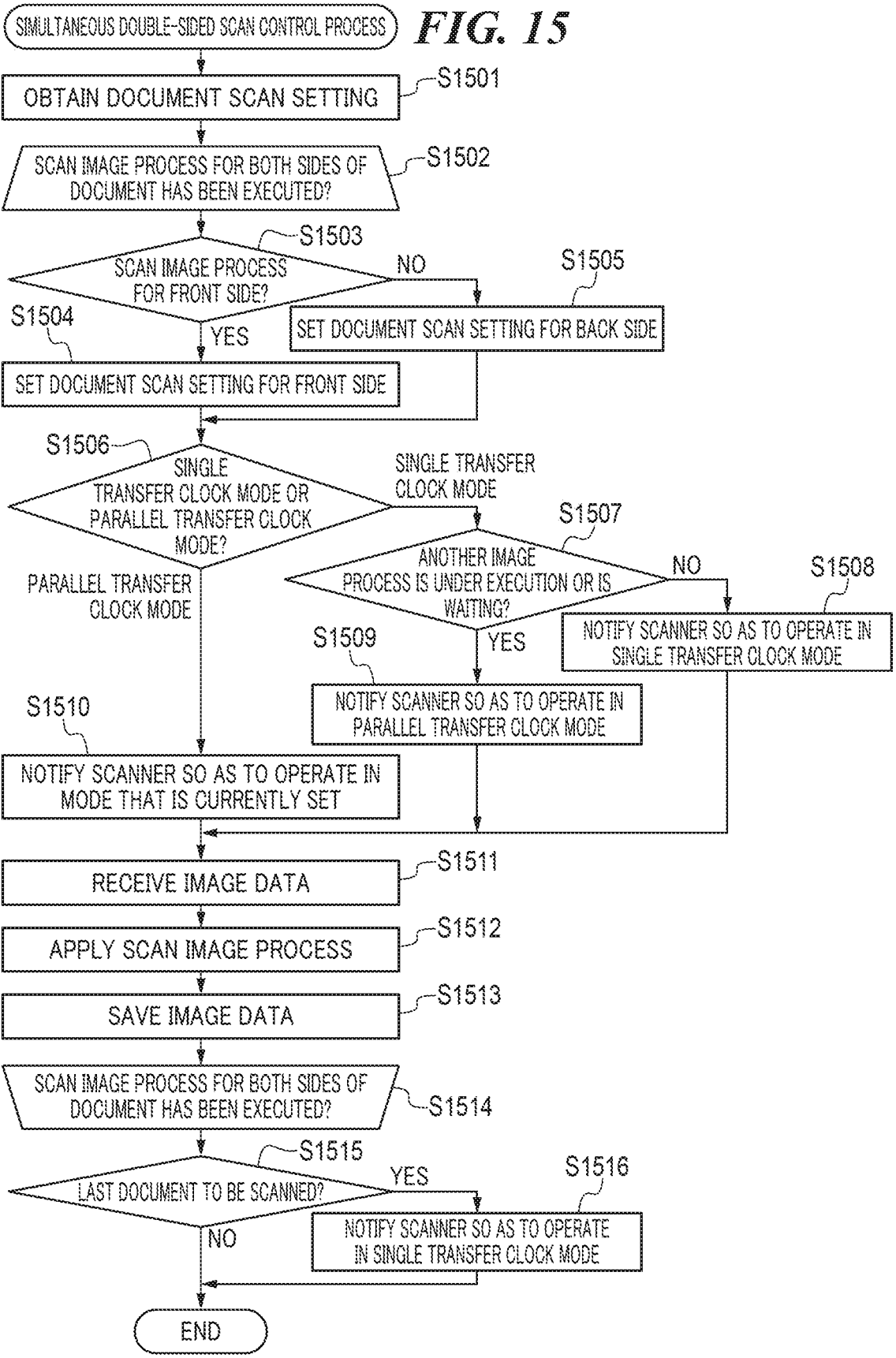
FIG. 15 is a flowchart showing procedures of a simultaneous double-sided scan control process executed by the MFP of FIG. 1.

FIG. 15 is a flowchart showing procedures of the simultaneous double-sided scan control process executed by the MFP 100 of FIG. 1. The process of FIG. 15 is executed when the CPU 102 runs the program stored in the ROM 103 etc. The process of FIG. 15 is executed when the MFP 100 receives an execution instruction for a job including the simultaneous double-sided scan process. The process of FIG. 15 is executed by the MFP 100 for every document when an execution instruction for a scan job that scans both sides of documents is received, for example.

As shown in FIG. 15, the CPU 102 obtains the document scan setting set through the operation unit 109 (step S1501). Next, the CPU 102 determines whether the scan image process for both sides of the document has been executed (step S1502).

As a result of the determination in the step S1502, when the scan image process for both sides of the document has been executed, the CPU 102 executes a process of step S1515 mentioned later. As a result of the determination in the step S1502, when the scan image process for both sides of the document has not been executed, the CPU 102 determines whether the image process to be executed is a front-side scan image process on the basis of the number of times of the image data transfer from the scanner 114 (step S1503).

As a result of the determination in the step S1503, when the image process to be executed is a front-side scan image process, the CPU 102 selects the ASIC that executes the scan image process corresponding to the obtained document scan setting from among the ASIC 701 through 705 in the image processor 113. The CPU 102 sets the front-side scan setting to the selected ASIC (step S1504) and performs a process of step S1506 mentioned later.

As a result of the determination in the step S1503, when the image process to be executed is not the front-side scan image process, the CPU 102 selects the ASIC that executes the scan image process corresponding to the obtained document scan setting from among the ASIC 701 through 705 in the image processor 113. The CPU 102 sets a back-side scan setting to the selected ASIC (step S1505). Next, the CPU 102 determines whether the operation mode of the scanner 114 is the single transfer clock mode or the parallel transfer clock mode (step S1506).

As a result of the determination in the step S1506, when the operation mode of the scanner 114 is the single transfer clock mode, the CPU 102 determines whether another image process by an ASIC other than the selected ASIC is under execution or is waiting (step S1507).

As a result of the determination in the step S1507, when another image process is not under execution and is not waiting, the CPU 102 notifies the scanner 114 so as to operate in the single transfer clock mode (step S1508). Next, the CPU 102 performs a process of step S1511 mentioned later.

As a result of the determination in the step S1507, when another image process is under execution or is waiting, the CPU 102 notifies the scanner so as to operate in the parallel transfer clock mode (step S1509), and performs the process of the step S1511.

As a result of the determination in the step S1506, when the scanner 114 is in the parallel transfer clock mode, the CPU 102 does not execute the process of the step S1507. The CPU 102 notifies the scanner 114 so as to operate in the mode that is currently set, i.e., in the parallel transfer clock mode (step S1510). That is, when the clock mode is switched from the single transfer clock mode as the standard setting to the parallel transfer clock mode while executing a job including the simultaneous double-sided scan process in the embodiment, the MFP 100 maintains the parallel transfer clock mode until completing execution of the job concerned. Moreover, in this case, the MFP 100 does not execute the determination process of the step S1507 that monitors an execution situation of another job different from the above-mentioned job until completing execution of the above-mentioned job.

Next, the CPU 102 receives image data from the scanner 114 (the step S1511). Next, the CPU 102 applies the scan image process to the received image data by the ASIC to which the document scan setting is set (step S1512). Next, the CPU 102 saves the image data, which has been subjected to the scan image process, into the RAM 104 (step S1513) and determines whether the scan image process for both sides of the document has been executed (step S1514).

As a result of the determination in the step S1514, when the scan image process for at least one side of the document has not been executed, the CPU 102 returns the process to the step S1503. As a result of the determination in the step S1514, when the scan image process for both sides of the document has been executed, the CPU 102 determines whether the scan target is the last scan document (step S1515).

As a result of the determination in the step S1515, when the scan target is not the last scan document, the CPU 102 finishes this process and executes the simultaneous double-sided scan control process to the following document.

As a result of the determination in the step S1515, when the scan target is the last scan document, the CPU 102 notifies the scanner 114 so as to operate in the single transfer clock mode (step S1516) and finishes this process.

Thereby, the MFP 100 having the simultaneous double-sided scan function is able to execute jobs in parallel using the minimum resources in the embodiment.

It should be noted that the simultaneous double-sided scan control process may be executed in place of the process of the step S804 in the embodiment.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-166467, filed Sep. 12, 2019, which is hereby incorporated by reference herein in its entirety.

What is claimed is:

1. An image processing apparatus comprising:
a controller that includes an image processor that performs an image process on image data;
a scanner that scans a document; and
a scanner controller that includes a memory for storing image data generated by scanning the document with the scanner and that transfers the image data stored in the memory to the controller via a data bus,
wherein the image processing apparatus sets a frequency of an image transfer clock for transferring the image data from the scanner controller to the controller,
wherein the image processing apparatus sets the frequency of the image transfer clock to a first frequency in a case where a first job for scanning a plurality of documents with the scanner, transferring image data generated by scanning the plurality of documents to the controller, and performing image process on the image data with the image processor is not performed in parallel to a second job for performing another image process with the image processor,
wherein the image processing apparatus sets the frequency of the image transfer clock to a second frequency that is lower than the first frequency in a case where the first job is executed in parallel to the second job, and
wherein the frequency of the image transfer clock that has been set to the second frequency is not changed until the first job is completed even in a case where the second job is completed before the first job is completed.

2. The image processing apparatus according to claim 1, wherein the first job is for simultaneously scanning both sides of each of the plurality of documents and transferring image data generated by scanning both sides of each of the plurality of documents.

3. The image processing apparatus according to claim 1, wherein the frequency of the image transfer clock that has been set to the second frequency is set to the first frequency after the first job is completed.

4. The image processing apparatus according to claim 1, further comprising:
a temporary memory that stores the image data on which the image process has been performed; and
a printer that performs printing based on the image data.

5. A control method for an image processing apparatus including a controller that includes an image processor that performs an image process on image data, a scanner that scans a document, and a scanner controller that includes a memory for storing image data generated by scanning the document with the scanner and that transfers the image data stored in the memory to the controller via a data bus, the control method comprising:
setting a frequency of an image transfer clock for transferring the image data from the scanner controller to the controller;
setting the frequency of the image transfer clock to a first frequency in a case where a first job for scanning a plurality of documents with the scanner, transferring image data generated by scanning the plurality of documents to the controller, and performing image process on the image data with the image processor is not performed in parallel to a second job for performing another image process with the image processor;
setting the frequency of the image transfer clock to a second frequency that is lower than the first frequency in a case where the first job is executed in parallel to the second job; and
not changing the frequency of the image transfer clock that has been set to the second frequency until the first job is completed even in a case where the second job is completed before the first job is completed.

6. A non-transitory computer-readable storage medium storing a control program causing a computer to execute a control method for an image processing apparatus including a controller that includes an image processor that performs an image process on image data, a scanner that scans a document, and a scanner controller that includes storage a memory for storing image data generated by scanning the document with the scanner and that transfers the image data stored in the memory to the controller via a data bus, the control method comprising:
setting a frequency of an image transfer clock for transferring the image data from the scanner controller to the controller;
setting the frequency of the image transfer clock to a first frequency in a case where a first job for scanning a plurality of documents with the scanner, transferring image data generated by scanning the plurality of documents to the controller, and performing image process on the image data with the image processor is not performed in parallel to a second job for performing another image process with the image processor;

setting the frequency of the image transfer clock to a second frequency that is lower than the first frequency in a case where the first job is executed in parallel to the second job; and not changing the frequency of the image transfer clock that has been set to the second frequency until the first job is completed even in a case where the second job is completed before the first job is completed.

\* \* \* \* \*